(12) United States Patent
Pedersen et al.

(10) Patent No.: US 8,423,008 B2
(45) Date of Patent: Apr. 16, 2013

(54) SIGNALING UE MEASUREMENT RESTRICTIONS FOR INTER-CELL INTERFERENCE

(75) Inventors: Klaus Ingemann Pedersen, Aalborg (DK); Frank Frederiksen, Klarup (DK); Woonhee Hwang, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 104 days.

(21) Appl. No.: 12/928,851

(22) Filed: Dec. 20, 2010

(65) Prior Publication Data
US 2012/0157082 A1    Jun. 21, 2012

(51) Int. Cl.
*H04M 3/00* (2006.01)
(52) U.S. Cl.
USPC ........... 455/418; 455/434; 455/436; 455/437; 455/438; 455/439; 455/442; 455/443; 455/444; 455/63.1; 455/67.13; 370/310.2; 370/328; 370/331; 370/332; 370/333; 370/334; 370/338
(58) Field of Classification Search .................. 455/418, 455/436–444, 434, 63.1, 67.13; 370/310.2, 370/328, 331–334
See application file for complete search history.

(56) References Cited

U.S. PATENT DOCUMENTS

| | | | |
|---|---|---|---|
| 2005/0096062 A1* | 5/2005 | Ji et al. ........................ | 455/450 |
| 2008/0253319 A1* | 10/2008 | Ji et al. ........................ | 370/328 |
| 2009/0257390 A1* | 10/2009 | Ji et al. ........................ | 370/329 |
| 2010/0202311 A1 | 8/2010 | Lunttila et al. ................ | 370/252 |
| 2011/0286346 A1* | 11/2011 | Barbieri et al. ............... | 370/252 |

FOREIGN PATENT DOCUMENTS

WO    WO 2011/130401 A1    10/2011

OTHER PUBLICATIONS

T. Moulsley, "LS on CSI Measurements on Restricted Subframes for eICIC", 3GPP TSG-RAN WG1 #63, R1-106551, Nov. 15-19, 2010, Jacksonville, FL, USA.
Catt, 3GPP TSG RAN WG2 Meeting #71 bis, R2-105335, "Some Potential Impacts of eICIC Time-domain Solutions on UE", Xi'an, China, (Oct. 2010), (2 pages).
Nokia Siemens Networks et al., 3GPP TSG RAN WG1 #62-bis Meeting, R1-105551, "TDM eICIC coordination between macro eNBs and CSG Home eNBs.", Xi'an, China, Oct. 2010, XP050450654, 6 pages.
Nokia Siemens Networks et al., 3GPP TSG RAN WG4#57 Meeting, R4-104309, "TDM, eICIC Patterns for Rel-10 UE measurement restrictions", Jacksonville, USA, Nov. 2010, XP050499494, 4 pages.
TSG-RAN WG1 Meeting #62bis, R1-105779, "Way Forward on time-domain extension of Rel 8/9 backhaul-based ICIC", Xi'an, China, Oct. 2010, XP002669340, 4 pages.
International Search Report for related PCT Application EP2011/072538 mailed Feb. 24, 2012.

* cited by examiner

*Primary Examiner* — Steve D Agosta
(74) *Attorney, Agent, or Firm* — Harrington & Smith (57) ABSTRACT

A network access node eNB sends to a user equipment UE a pattern of subframe measurement restrictions and an indication of how to utilize the pattern for measuring subframes. The indication may select from among: the UE's own-cell measurements; the UE's neighbor-cell measurements; both same and neighbor-cell measurements, and no measurement restrictions. The eNB may generate the pattern from an almost-blank subframe ABS pattern for the UE's own-cell and of its neighbor-cell. The pattern and indication may be sent in separate RRC messages, or if sent in one message there is a second indication sent in a second RRC message instructing the UE to terminate utilizing the pattern and indication for restricting its subframe measurements. Embodiments are particularly useful for inter-cell interference mitigation eICIC for the LTE-Advanced system.

16 Claims, 4 Drawing Sheets

SIGNALING UE MEASUREMENT RESTRICTIONS FOR INTER-CELL INTERFERENCE

CROSS REFERENCE TO RELATED APPLICATION

This application concerns subject matter related to that detailed at co-owned Provisional U.S. Patent Application 61/389,865 (filed on Oct. 5, 2010) entitled "Channel State Information Measurement and Reporting", the entire contents of which are hereby incorporated.

TECHNICAL FIELD

The exemplary and non-limiting embodiments of this invention relate generally to wireless communication systems, methods, devices and computer programs and, more specifically, relate to managing inter-cell interference and wireless signaling related thereto.

BACKGROUND

Figure 1:
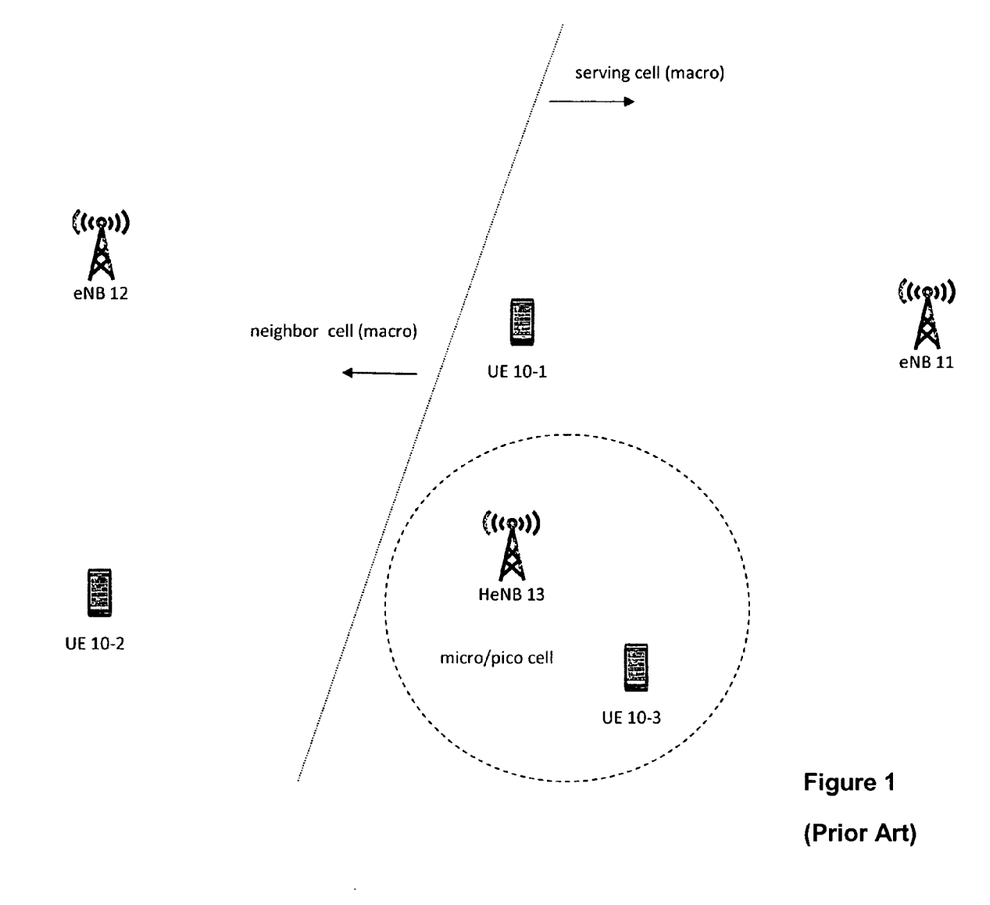
FIG. 1 is a schematic diagram showing a serving macro eNB cell, a neighbor macro cell and a neighbor micro/pico/femto cell which are subject to co-channel interference and which is an environment in which exemplary embodiments of the invention may be advantageously practiced.

The following abbreviations are herewith defined:
3GPP third generation partnership project
ABS almost blank subframe
CRS common reference symbols
CSI channel state Information
DL downlink
eNB evolved nodeB/access node (of an LTE system)
eICIC enhanced inter-cell interference coordination
E-UTRAN evolved UTRAN (LTE or 3.9G)
HeNB home eNB (base station)
LTE long term evolution of 3GPP
LTE-A long term evolution-Advanced
MBSFN multicast/broadcast single frequency network
PDCCH physical downlink control channel
PRS positioning reference symbols
RLM/RRM radio link management/radio resource management
RRC radio resource control
TDM time-domain multiplexing (or time division multiple access)
UE user equipment (e.g., mobile equipment/station)
UL uplink
UMTS universal mobile telecommunications system
UTRAN UMTS terrestrial radio access network FIG. 1 illustrates an exemplary environment illustrating the potential for inter-cell interference and which embodiments of the invention may be utilized to advantage. From the perspective of the first UE 10-1 there is a serving cell controlled by a first or serving eNB 11, an adjacent neighbor cell which is controlled by a second or neighbor eNB 12 in which a second UE 10-2 operates, and also a third cell controlled by a home eNB or HeNB 13 in which a third UE 10-3 operates. By example the first and second cells are macro cells (e.g., conventional cellular) and the third cell is a micro, pico or femto cell whose operational area overlies the serving cell in whole or in part. The micro/pico cell is also considered a neighbor cell to the serving cell.

In case cells are on the same frequency, there is a potential for inter-cell interference particularly for UEs operating near the cell edge and the bounds of neighbor cells. The first UE 10-1 in FIG. 1 is near the cell edge of both the neighbor HeNB cell and the serving macro cell. In LTE-Advanced there is a TDM enhanced inter-cell interference coordination (eICIC) which is applied between the eNBs and the HeNBs to control, coordinate, and potentially reduce this inter-cell co-channel interference. For such cases it is also beneficial to optimize the channel state information (CSI) which the various UEs report on the UL to their respective access nodes, which enables the aforementioned TDM eICIC to also be optimized.

Figure 2:
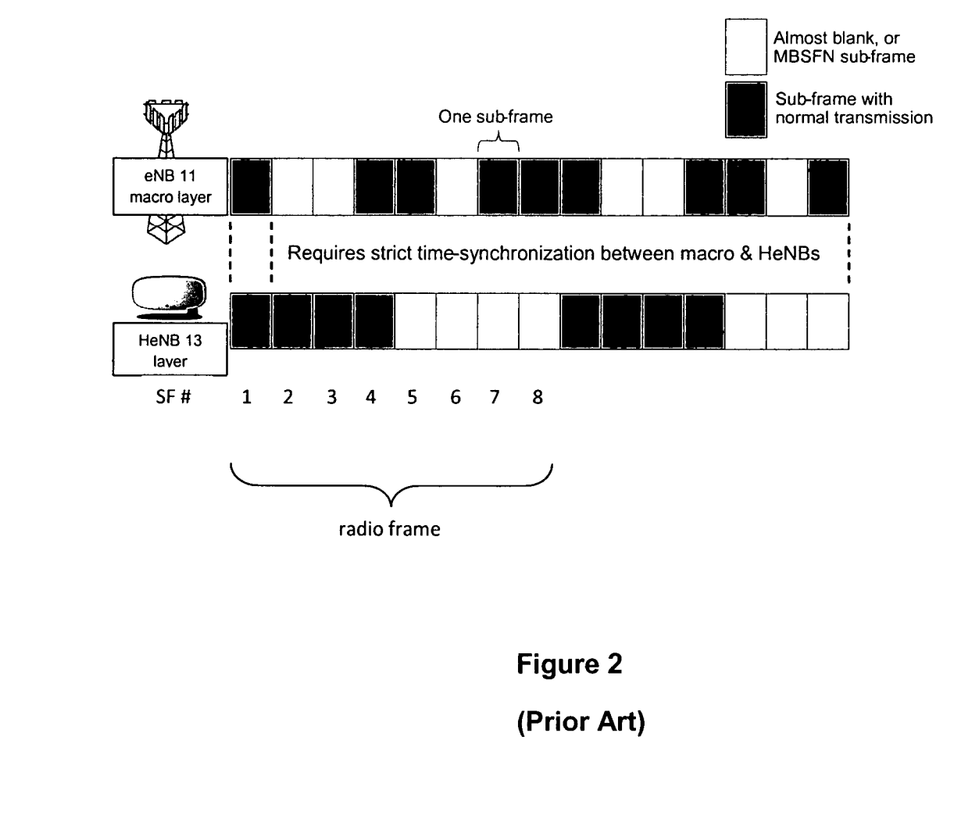
FIG. 2 is a timing diagram of downlink subframes for the serving macro eNB and the HeNB of FIG. 1 illustrating example patterns for mitigating inter-cell interference according to the eICIC concept of LTE-Advanced.

FIG. 2 refers to subframes of the PDCCH; UL and DL user traffic is on the various shared channels which are mapped from the scheduling/allocation tables which the eNB sends DL on the PDCCH. By FIG. 2 the serving eNB 11 is restricted in that it may transmit on any subframe except those indexed as SF#s 2, 3 and 6, while FIG. 2 restricts the HeNB 13 to transmit on any subframe except those indexed as SF#s 5-8. In this context, "almost blank" refers to subframes in which nearly no transmission may be sent from the respective access node eNB 11 or HeNB 13; some very restricted transmissions are allowed such as only transmissions of multi-media broadcast over a single frequency MBSFN.

All ABSs carry CRS. If the primary/secondary synchronization signal (PSS/SSS), primary broadcast channel (PBCH), system information block 1 (SIB1), paging or positioning reference signal (PRS) coincide with an ABS, they are transmitted in the ABS (with associated PDCCH when the SIB1/Paging is transmitted). No other signals are transmitted in ABSs. If an ABS coincides with a multi-media broadcast over a signal frequency (MBSFN) subframe not carrying any signal in its data region, a common reference signal (CRS) is not present in the data region. MBSFN subframes carrying signal in the data region shall not be configured as ABS.

In concept, the macro-cell UEs (such as UE-1) which are close to the HeNB cell shall be scheduled during the time periods corresponding to the neighboring cell's ABSs (i.e., HeNB cell's ABSs). By example, this means the serving eNB 11 should schedule UE 10-1 only in subframes 5 and 7-8, which avoids the DL signal to that UE 10-1 being exposed to too high interference from the HeNB cell. For eNB 11 subframes 2-3 are also ABSs to similarly avoid interference with the neighbor macro cell whose access node eNB 12 has its own transmission/ABS pattern. In different embodiments the eICIC concept may be employed between macro and pico cells (a heterogeneous network or HetNet) or between macro and HeNB cell or other adjacent neighbor cells.

For the TDM eICIC to operate properly, there have been proposals that at least the macro eNB signal to its own UEs which sub-frames are ABSs (and therefore in possible use by neighbor HeNB cells). Specifically, it has been agreed in 3GPP that the network node to which the UE is connected (e.g. the macro eNB 11) should be able to signal RRM measurement restrictions to a selected subset of Rel-10 UEs or all of its Rel-10 UEs in the cell. In order to be able to cover multiple scenarios with combinations of macro, pico, and HeNBs, it has been proposed that the Rel-10 UEs may be signaled a) the time domain pattern with measurement restrictions for the UE's own-cell (serving cell) RRM measurements, and b) the time domain pattern with measurement restrictions for the UE's neighbor-cell RRM measurements. This agreement is in principle only and the exact details of such signaling are still under discussion in the 3GPP. In general these measurement patterns may be considered similar to the ABS patterns in that for LTE-Advanced it is expected that for a given macro/micro layer the eNB will use the ABS pattern to restrict its DL transmissions and the UE will use the same ABS pattern, which is used at the network node for muting, to restrict which DL subframes the UE measures (e.g., the UE's restricted measurement pattern includes or overlaps the ABS pattern which filters the ABSs from the subframes the UE measures and reports).

The neighbor macro cells may have a common ABS subset, and there may also be a common ABS subset among the macro cell and the micro/pico/femto cell(s) lying within it. Not all the various UEs have to be signaled the ABS pattern(s); the network may have a choice such as to signal the ABS pattern(s) to only those UEs near a cell edge. Yet to be resolved in the 3GPP is what patterns are to be signaled and how specifically to signal them to the UEs in a cell. Exemplary embodiments detailed herein resolve that issue.

SUMMARY

In a first aspect thereof the exemplary embodiments of this invention provide an apparatus comprising at least one memory storing a program of computer instructions, and at least one processor. In this first aspect the at least one memory and the computer instructions are configured with the at least one processor to cause the apparatus at least to: send to a user equipment a pattern of subframe measurement restrictions; and send to the user equipment an indication of how to utilize the pattern for measuring subframes.

In a second aspect thereof the exemplary embodiments of this invention provide a method comprising: sending from a network access node to a user equipment a pattern of subframe measurement restrictions; and sending from the network access node to the user equipment an indication of how to utilize the pattern for measuring subframes.

In a third aspect thereof the exemplary embodiments of this invention provide a computer readable memory storing a program of computer readable instructions comprising: code for sending to a user equipment a pattern of subframe measurement restrictions; and code for sending to the user equipment an indication of how to utilize the pattern for measuring subframes.

In a fourth aspect thereof the exemplary embodiments of this invention provide an apparatus comprising at least one memory storing a program of computer instructions, and at least one processor. In this fourth aspect the at least one memory and the computer instructions are configured with the at least one processor to cause the apparatus at least to: receive from a network access node a pattern of subframe measurement restrictions and an indication of how to utilize the pattern for measuring subframes; and responsive to receiving at least the indication, selecting subframes for measuring according to the received pattern and the indication.

In a fifth aspect thereof the exemplary embodiments of this invention provide a method comprising: receiving at an apparatus from a network access node a pattern of subframe measurement restrictions and an indication of how to utilize the pattern for measuring subframes; and responsive to receiving at least the indication, the apparatus selecting subframes for measuring according to the received pattern and the indication.

In a sixth aspect thereof the exemplary embodiments of this invention provide a computer readable memory storing a program of computer readable instructions comprising: code for receiving from a network access node a pattern of subframe measurement restrictions and an indication of how to utilize the pattern for measuring subframes; and code, responsive to receiving at least the indication, for selecting subframes for measuring according to the received pattern and the indication.

These and other aspects are detailed below with particularity.

BRIEF DESCRIPTION OF THE DRAWINGS

The foregoing and other aspects of the exemplary embodiments of this invention are made more evident in the following Detailed Description, when read in conjunction with the attached Drawing Figures.

DETAILED DESCRIPTION

Though not limited thereto, embodiments of this invention are particularly advantageous for use in LTE-Advanced systems, and concern signaling subframe patterns to the UE in which the UE performs some measurement in the subframes identified by the signaled patterns. Mapping to the subframes in which these various measurements might be reported and how to arrange those UL reports may be done according to the scheme set forth in the above-referenced and co-owned application entitled "Channel State Information Measurement and Reporting", or the manner and channel for sending the measurements UL might be according to some other technique without departing from these teachings.

The pattern signaling described herein is DL, and so embodiments of the invention may be practiced in both network access nodes and in the UEs. While the concept is described with reference to LTE-Advanced, such description is by example and for clarity of description only and not a limitation; these teachings may be readily extended to other communication systems. The particular examples detailed herein assume an active-state UE (not in idle/sleep mode), though these teachings may be extended to signaling mechanisms for idle mode UEs.

There are at least three distinct types of measurement patterns for which it might be advantageous for the eNB to be able to signal to a given UE. There is a first pattern which is the UE's own-cell RLM/RRM measurements, by example the macro layer pattern for the serving cell shown at FIG. 2. There is a second pattern which is the UE's neighbor-cell RLM/RRM measurements, by example the HeNB layer pattern shown at FIG. 2 for the neighbor micro cell or a similar transmission/ABS pattern for the neighbor macro cell (eNB 12). And there is a third pattern for CQI measurements, which may be different from the above measurement patterns.

Both the first and the third patterns above may be considered to be the serving cell RRM measurement patterns while the second pattern may be considered to be the neighbor cell's RRC measurement pattern, in which the neighbor might be a micro/pico/femto cell or an adjacent macro cell.

According to exemplary embodiments of the invention the network/eNB 11 signals to the UE 10-1 a general pattern with RRM measurement restrictions (i.e, an ABS pattern) for that UE 10-1. If no pattern is signaled to the UE by the network, then the UE does not apply any RRM measurement restrictions at all, which is considered the default condition for operating Rel-8 UEs.

This general pattern may in various instances be the first pattern (the serving cell's ABS) or the third pattern (the serving cell's CQI pattern different from its ABS pattern) noted above. In general the network signals a single general pattern to the UE, and the network is the entity to decide the pattern it signals. The serving eNB 11 may use the ABS pattern for a neighbor cell/eNB 12 in deciding this general pattern, and it may learn the neighbor ABS pattern via inter-cell communications such as across an X2 interface in LTE/LTE-Advanced (eNB to eNB directly) or by utilizing higher network nodes as intermediaries. For the case in which the neighbor cell is the micro/pico/femto cell HeNB 13, the serving eNB 11 may know the HeNB's ABS pattern similarly since the HeNB 13 operates within the macro eNB 11 cell as a heterogeneous network, or the serving eNB 11 may obtain the HeNB's ABS pattern through information exchange with the management system of the HeNB 13.

Then, when the network configures that UE 10-1 it sends additionally a utilization indication (or pattern or message) to the UE 10-1 which indicates how the measurement restrictions of the previously-signaled general pattern shall be applied. By example, the utilization indication may be signaled as bits whose possible values select among two or more of the following four possible utilizations for the general pattern:

(a) the UE's own-cell RRM measurements,
(b) the UE's neighbor or other-cell RRM measurements,
(c) both the UE's own-cell and other-cell RRM measurements, or
(d) no measurement restrictions at all.

By example, for option (a) above the UE 10-1 uses the general pattern to restrict which subframes in which it measures DL transmissions from the serving eNB 11. For option (b) above the UE 10-1 uses the general pattern to restrict which subframes in which it measures DL transmissions from the neighbor eNB 13. For option (c) above the UE 10-1 uses the general pattern to restrict which subframes in which it measures DL transmissions from both the serving eNB 11 and from the neighbor eNB 13. And of course for option (d) above the UE 10-1 does not utilize the general pattern at all.

Alternatively, in an exemplary embodiment the general pattern and the utilization indication may be combined into one RRC message, with the eNB having the option to send again a further utilization indication (apart from another general pattern) which indicates option (d) above. In this case the combined RRC message switches on the measurement restrictions given by the general pattern and the further utilization message which selects option (d) switches off the measurement restrictions. For option (d) the UE may still retain the general pattern in its local memory, potentially to be switched on again or changed/updated via further signaling from the network.

These exemplary embodiments simplify the signaling of measurement restrictions because they avoid the need to signal separately the time-domain measurement restriction patterns for the UE's own-cell and its other-cell measurement restrictions. This saves on signaling overhead as compared to other approaches since the eNB would in any case configure the same measurement restrictions for the UE's own-cell (e.g., the serving cell ABS pattern) and for the UE's other-cell measurements (e.g., the neighbor cell ABS pattern) whenever it is desirable to have both RRM measurement restrictions enabled. These exemplary embodiments are additionally simpler to implement from the UE perspective as compared to the UE receiving two different measurement restriction patterns; in these embodiments there is only one general pattern which the UE utilizes for restricting its measurements at any given time.

By example, the UE may utilize the measurement restriction patterns to restrict the subset of subframes in which the UE measures channel state information (CSI), such as channel quality indicator (CQI), precoding matrix indicator (PMI) and rank indicator (RI). These measurements are reported on the physical uplink control channel PUCCH to the eNB controlling the UE, and the eNB may signal the subsets of subframes (the measurement restriction pattern) by, for example a bitmap having a size matching the size of the ABS pattern. The eNB can then map the reported CSI feedback to the configured subset, which in these examples is the general pattern, via explicit RRC configuration.

Figure 3:
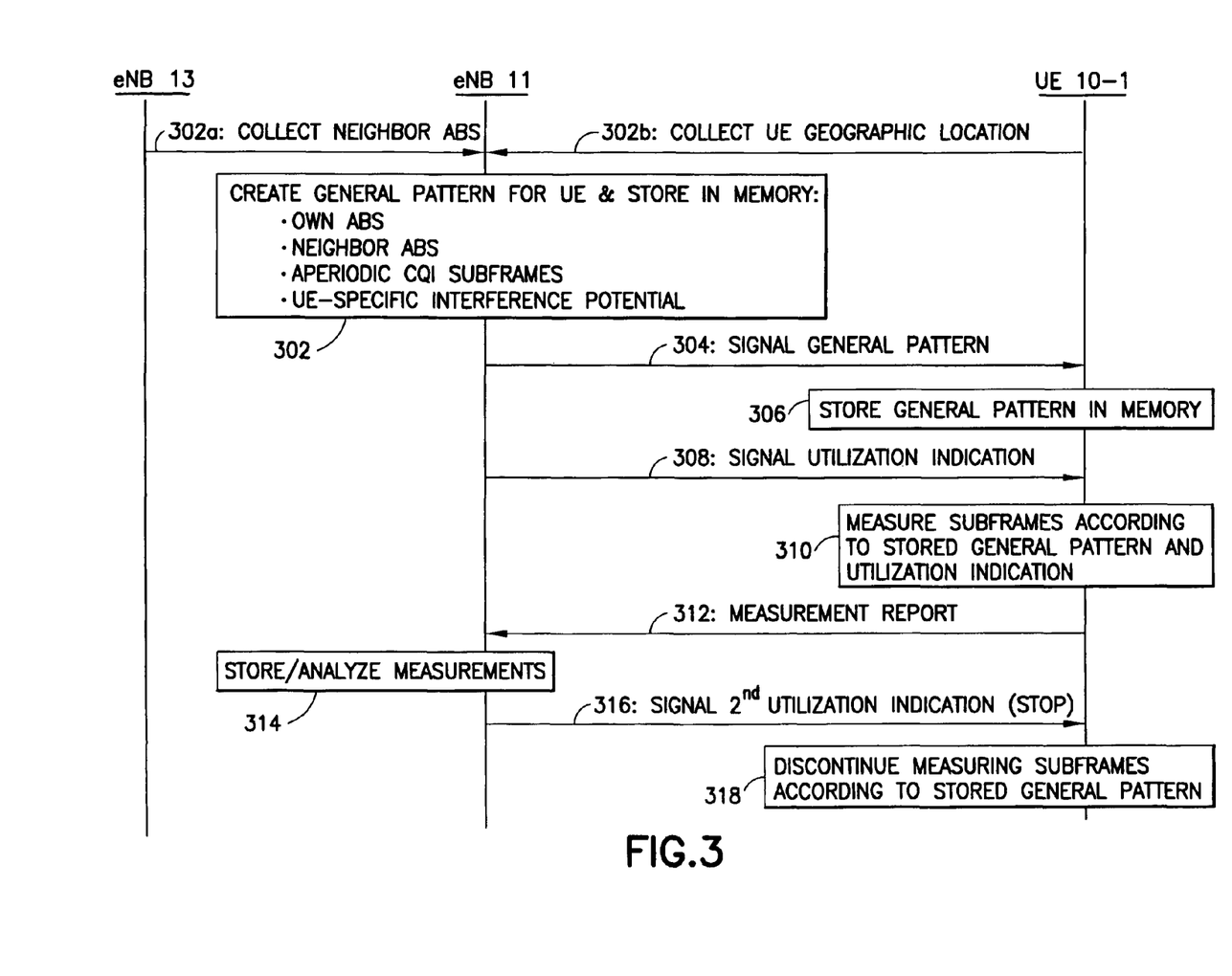
FIG. 3 is a logical flow diagram including signaling between a serving eNB and a UE that illustrates the operation of various methods, and the result of execution of various computer program instructions embodied on a computer readable memory, in accordance with the exemplary embodiments of this invention.

FIG. 3 is an exemplary signaling diagram illustrating the embodiments detailed above. The serving eNB 11 creates a general pattern of subframe measurement restrictions for a UE 10-1. By example the eNB 11, may create this general pattern from its own ABS pattern, alone or in combination with one or more neighbor cell ABS patterns, and/or it may be a pattern for aperiodic CQI. The serving eNB 11 may learn the neighbor ABS directly from a neighbor eNB 12 as shown at block 302a (which is typically not wireless signaling). Additionally the eNB 11 may generate the general pattern depending in part on some evaluation of interference probability, such as learning the geographic location of the UE 10-1 at message 302b and determining whether the UE 10-1 is near a cell edge and which neighbor eNB(s) are subject to this potential interference. At RRC message 304 the serving eNB 11 signals the general pattern to the UE 10-1 which stores the received general pattern in its local memory.

Then the serving eNB 11 sends to the UE 10-1 a utilization indication at RRC message 308, which selects a particular utilization for the general pattern. Above are detailed four possible utilizations for the general pattern though these are exemplary and not limiting. At block 310 the UE 10-1 then begins measuring subframes according to the utilization indication and the stored general pattern. The UE 10-1 reports the measurements it does take in a measurement report at 312, which the serving eNB 11 stores and analyzes for its management of radio resources in the cell. Steps 310 and 312 continue so long as the general pattern is not replaced or the utilization indication is not changed for as long as the UE 10-1 remains within the cell and in an RRC connected state (not idle).

For the alternate embodiment noted above in which messages 304 and 308 are combined into one RRC message, the UE 10-1 combines blocks 306 and 310 and continues measuring until it receives from the serving eNB 11a second utilization indication at message 16 which selects option (d) above (no measurement restrictions at all) at which time the UE 10-1 discontinues at block 318 the restricted subframe measurements.

Figure 4:
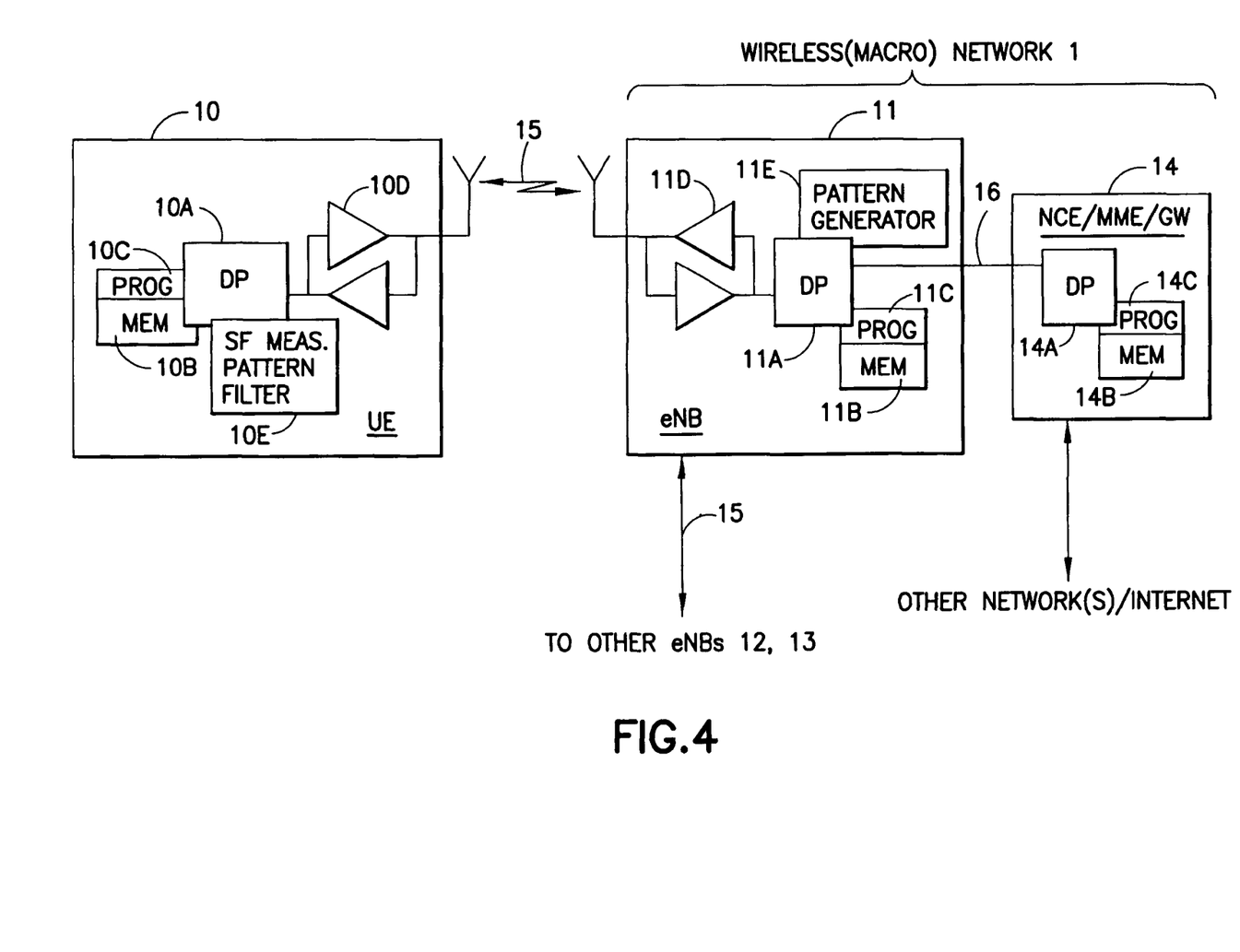
FIG. 4 is a simplified block diagram of various electronic devices that are suitable for use in practicing the exemplary embodiments of this invention.

FIG. 4 illustrates a simplified block diagram of various electronic devices that are suitable for use in practicing the exemplary embodiments of this invention. In FIG. 4 a (macro) wireless network 1 is adapted for communication with a UE 10 via a node B (e.g., base station or macro serving eNB) 11. The network 1 may include a higher controlling node generically shown as a gateway GW 14, which may be referred to variously as a radio network controller RNC, a mobility management entity MME, or a system architecture evolution gateway SAE-GW. The GW 14 represents a node higher in the network than the eNB 11 and in certain embodiments the signaling detailed herein is independent of that GW 14, except to the extent the eNB 11 may sometimes pass certain CSI information it receives from the UE 10 to the GW 14.

The UE 10 includes a data processor (DP) 10A, a memory (MEM) 10B that stores a program (PROG) 10C, and a suitable radio frequency (RF) transmitter and receiver 10D for bidirectional wireless communications with the eNB 12, which also includes a DP 11A, a MEM 11B that stores a PROG 11C, and a suitable RF transmitter and receiver 11D. The eNB 11 may be coupled via a data path 16 (e.g., Iub or S1) to the serving or other GW 14. The eNB 11 and the UE 10 communicate over wireless links 15, each using one or more antennas (one antenna shown for each). In an embodiment, the wireless link 15 is a physical downlink control channel such as PDCCH and the uplink is a physical uplink shared or control channel. At least one of the PROGs 10C and 11C is assumed to include program instructions that, when executed by the associated DP, enable the electronic device to operate in accordance with the exemplary embodiments of this invention, as discussed below in greater detail.

Within the UE 10, either separate from or within the DP 10A, is a subframe measurement pattern filter 10E that utilizes the general pattern and the utilization indicator it receives from the serving eNB 11 to filter which subframes it measures and reports upon. Also within the eNB 12, either separate from or within the DP 11A, is a general pattern generator 11E that uses one or more of the parameters shown at block 302 to create a general pattern for restricting subframes which are to be measured by the UE 10. Further, within each device 10, 11, 14 is a modem; for the UE 10 and eNB 11 such a modem is embodied within the respective transmitter/receiver 10D, 11D, and is embodied within the DP 11A, 14A of the respective serving eNB 11 and GW 14 for communicating over the data link 16 between them.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the PROGs 10C, 11C is assumed to include program instructions that, when executed by the associated DP, enable the electronic device to operate in accordance with the exemplary embodiments of this invention. Inherent in the DPs 10A, 11A is a clock to enable synchronism among the various devices for transmissions and receptions within the appropriate time intervals and slots required.

In general, the exemplary embodiments of this invention may be implemented by computer software PROGs 10C, 11C embodied on the respective memories MEMs 10B, 11B and executable by the respective DPs 10A, 11A of the UE 10 and serving eNB 11, or by hardware, or by a combination of software and/or firmware and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

While FIGS. 3-4 illustrate with respect to the serving eNB 11 shown at FIG. 1, embodiments of the invention may similarly be implemented by the HeNB 13 which is similarly constructed as shown at FIG. 4 for the serving eNB 11.

The MEMs 10B and 11B may be of any type suitable to the local technical environment and may be implemented using any suitable data storage technology, such as semiconductor-based memory devices, magnetic memory devices and systems, optical memory devices and systems, fixed memory and removable memory. The DPs 10A and 11A may be of any type suitable to the local technical environment, and may include one or more of general purpose computers, special purpose computers, microprocessors, digital signal processors (DSPs) and processors based on a multi-core processor architecture, as non-limiting examples.

For the aspects of this invention related to the network/eNB, embodiments of this invention may be implemented by computer software executable by a data processor of the Node B 11, such as the processor 11A shown, or by hardware, or by a combination of software and hardware. For the aspects of this invention related to the UE, embodiments of this invention may be implemented by computer software executable by a data processor of the UE 10, such as the processor 10A shown, or by hardware, or by a combination of software and hardware. Further in this regard it should be noted that the various logical step descriptions at FIG. 3 above may represent program steps, or interconnected logic circuits, blocks and functions, or a combination of program steps and logic circuits, blocks and functions.

Exemplary embodiments of this invention encompass a method; an apparatus that includes a processor, memory, transmitter and receiver; and a memory embodying a computer program that, when executed by at least one processor, cause the host apparatus to operate as detailed above. By example, from the perspective of the network, the eNB sends to a user equipment a pattern of subframe measurement restrictions; and sends to the user equipment an indication of how to utilize the pattern for measuring subframes. Also by example, from the perspective of the user equipment there is received from a network access node a pattern of subframe measurement restrictions and an indication of how to utilize the pattern for measuring subframes; and responsive to receiving at least the indication, the apparatus selects subframes for measuring according to the received pattern and the indication.

In certain exemplary embodiments the following may also be implemented, individually or in combination. The indication of how to utilize the pattern selects from among at least three of: the user equipment's own-cell measurements; the user equipment's neighbor-cell measurements; both the user equipment's own-cell and neighbor-cell measurements; and no measurement restrictions. The network node may generate the pattern from an almost blank pattern for the user equipment's own-cell and at least one of: an almost blank pattern for the user equipment's neighbor-cell and a proximity of the user equipment to a neighbor-cell. The pattern of subframe measurement restrictions and the indication of how to utilize the pattern may be sent to the user equipment in respective first and second radio resource control messages, or alternatively in a single radio resource control message. For the latter case the indication of how to utilize the pattern may be considered a first indication, and then there is a second indication of how to utilize the pattern sent to the user equipment which indicates the user equipment is to terminate utilizing the pattern. As above these various particulars, except for generating the pattern, may be implemented separately in the network access node and in the UE.

Various modifications and adaptations may become apparent to those skilled in the relevant arts in view of the foregoing description, when read in conjunction with the accompanying drawings and the appended claims. For example, certain steps shown in FIG. 3 may be executed in other than the order shown, and certain of the computations described may be performed in other ways. However, all such and similar modifications of the teachings of this invention will still fall within the scope of this invention.

We claim:

1. An apparatus comprising:
    at least one memory storing a program of computer instructions; and
    at least one processor;
    in which the at least one memory and the computer instructions are configured with the at least one processor to cause the apparatus at least to:
    send to a user equipment a pattern of subframe measurement restrictions, the pattern generated from an almost blank pattern for the user equipment's own-cell and for the user equipment's neighbor-cell; and
    send to the user equipment an indication of how to utilize the pattern for measuring subframes, in which the indication of how to utilize the pattern selects from among at least three of:
    the user equipment's own-cell measurements;
    the user equipment's neighbor-cell measurements;
    both the user equipment's own-cell and neighbor-cell measurements; and
    no measurement restrictions.

2. The apparatus according to claim 1, in which the at least one memory and the computer instructions are configured with the at least one processor to cause the apparatus at least further to use the pattern to match subframe measurements received from the user equipment to individual measured subframes.

3. The apparatus according to claim 1, in which the at least one memory and the computer instructions are configured with the at least one processor to cause the apparatus at least further to:
    generate the pattern from the almost blank pattern for a proximity of the user equipment to a neighbor-cell.

4. The apparatus according to claim 1, in which the at least one memory and the computer instructions are configured with the at least one processor to cause the apparatus to send the pattern of subframe measurement restrictions to the user equipment in a first radio resource control message, and to send the indication of how to utilize the pattern to the user equipment in a second radio resource control message.

5. The apparatus according to claim 1, in which the at least one memory and the computer instructions are configured with the at least one processor to cause the apparatus to send to the user equipment in a single radio resource control message the pattern of subframe measurement restrictions and the indication of how to utilize the pattern.

6. The apparatus according to claim 5, in which the indication of how to utilize the pattern is a first indication, and the at least one memory and the computer instructions are configured with the at least one processor to cause the apparatus at least further to send to the user equipment a second indication of how to utilize the pattern which indicates the user equipment is to terminate utilizing the pattern.

7. The apparatus according to claim 1, in which the apparatus comprises an access node of a wireless network.

8. A method comprising:
    sending from a network access node to a user equipment a pattern of subframe measurement restrictions, the pattern generated from an almost blank pattern for the user equipment's own-cell and for the user equipment's neighbor-cell; and
    sending from the network access node to the user equipment an indication of how to utilize the pattern for measuring subframes, in which the indication of how to utilize the pattern selects from among at least three of:
    the user equipment's own-cell measurements;
    the user equipment's neighbor-cell measurements;
    both the user equipment's own-cell and neighbor-cell measurements; and
    no measurement restrictions.

9. The method according to claim 8, further comprising: the network access node generating the pattern from the almost blank pattern for a proximity of the user equipment to a neighbor-cell.

10. The method according to claim 8, in which the pattern of subframe measurement restrictions is sent to the user equipment in a first radio resource control message, and the indication of how to utilize the pattern is sent to the user equipment in a second radio resource control message.

11. The method according to claim 8, in which the pattern of subframe measurement restrictions and the indication of how to utilize the pattern are sent to the user equipment in a single radio resource control message.

12. The method according to claim 11, in which the indication of how to utilize the pattern is a first indication, and the method further comprises the network access node sending to the user equipment a second indication of how to utilize the pattern which indicates the user equipment is to terminate utilizing the pattern.

13. A tangible computer readable memory storing a program of computer readable instructions comprising:
    code for sending to a user equipment a pattern of subframe measurement restrictions, the pattern generated from an almost blank pattern for the user equipment's own-cell and for the user equipment's neighbor-cell; and
    code for sending to the user equipment an indication of how to utilize the pattern for measuring subframes, in which the indication of how to utilize the pattern selects from among at least three of:
    the user equipment's own-cell measurements;
    the user equipment's neighbor-cell measurements;
    both the user equipment's own-cell and neighbor-cell measurements; and
    no measurement restrictions.

14. An apparatus comprising:
    at least one memory storing a program of computer instructions; and
    at least one processor;
    in which the at least one memory and the computer instructions are configured with the at least one processor to cause the apparatus at least to:
    receive from a network access node a pattern of subframe measurement restrictions and an indication of how to utilize the pattern for measuring subframes, the pattern generated from an almost blank pattern for the user equipment's own-cell and for the user equipment's neighbor-cell; and responsive to receiving at least the indication, selecting subframes for measuring according to the received pattern and the indication, in which the indication of how to utilize the pattern selects from among at least three of:

the user equipment's own-cell measurements;

the user equipment's neighbor-cell measurements;

both the user equipment's own-cell and neighbor-cell measurements; and no measurement restrictions.

15. The apparatus according to claim 14, in which the at least one memory and the computer instructions are configured with the at least one processor to cause the apparatus at least further to send to the network access node a measurement report comprising information gathered from measuring performed in the selected subframes.

16. The apparatus according to claim 14, in which the pattern of subframe measurement restrictions is received in a first radio resource control message, and the indication of how to utilize the pattern is received in a second radio resource control message.

* * * * *